US008252261B2

(12) United States Patent
Jasra et al.

(10) Patent No.: US 8,252,261 B2
(45) Date of Patent: Aug. 28, 2012

(54) PROCESS FOR THE PREPARATION OF FINELY DIVIDED PRECIPITATED SILICA

(75) Inventors: Raksh Vir Jasra, Bhavnagar (IN); Haresh Mahipatlal Mody, Bhavnagar (IN); Rajesh Shantilal Somani, Bhavnagar (IN); Hari Chand Bajaj, Bhavnagar (IN); Dipak Balwantrai Shukla, Bhavnagar (IN); Niraj Rameshchandra Vyas, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 427 days.

(21) Appl. No.: 12/112,551

(22) Filed: Apr. 30, 2008

(65) Prior Publication Data
US 2009/0010832 A1  Jan. 8, 2009

(30) Foreign Application Priority Data

May 3, 2007 (IN) .............................. 954/DEL/2007

(51) Int. Cl.
*C01B 33/12* (2006.01)
(52) U.S. Cl. ...................................... 423/339
(58) Field of Classification Search .................. 423/335, 423/338, 339
See application file for complete search history.

(56) References Cited

U.S. PATENT DOCUMENTS

| | | | |
|---|---|---|---|
| 4,243,428 A | 1/1981 | Donnet et al. | |
| 4,495,167 A | 1/1985 | Nauroth et al. | |
| 5,034,207 A | 7/1991 | Kerner et al. | |
| 5,094,829 A | 3/1992 | Krivak et al. | |
| 5,123,964 A * | 6/1992 | Kerner et al. | 423/335 |
| 5,342,598 A | 8/1994 | Persello | |
| 5,827,363 A * | 10/1998 | Darsillo et al. | 106/484 |
| 5,851,502 A | 12/1998 | Turk et al. | |
| 6,180,076 B1 * | 1/2001 | Uhrlandt et al. | 423/335 |
| 6,214,912 B1 | 4/2001 | Chevallier et al. | |
| 6,468,493 B1 | 10/2002 | Chevallier et al. | |
| 6,902,715 B2 | 6/2005 | Maus et al. | |
| 7,037,476 B1 * | 5/2006 | Jasra et al. | 423/339 |
| 2003/0118500 A1 | 6/2003 | Chevallier et al. | |
| 2005/0228106 A1 | 10/2005 | Schaefer et al. | |
| 2006/0027142 A1 | 2/2006 | Huang | |

FOREIGN PATENT DOCUMENTS

IN    176707    8/1996

OTHER PUBLICATIONS

Brunauer et al. "Absorption of Gases in Multimolecular Layers", (1938), pp. 309-319, vol. 60, Journal of American Chemical Society.

* cited by examiner

*Primary Examiner* — Melvin C Mayes
*Assistant Examiner* — Bijay Saha
(74) *Attorney, Agent, or Firm* — K&L Gates LLP

(57) ABSTRACT

The present invention provides a process for the preparation of finely divided precipitated silica. Finely divided precipitated silica is prepared by neutralization of alkali silicate solution, under continuous stirring, at 60° to 90° C. in presence of alkali metal salt as coagulating agent, in various neutralization steps during which neutralization is interrupted for specific time. Further acidic silica sol, is added until 60 to 80% of total alkali is neutralized. The reaction mixture is then aged at least for 3 minute under continuous agitation, followed by circulation through centrifugal pump at an appropriate rate.

12 Claims, No Drawings

PROCESS FOR THE PREPARATION OF FINELY DIVIDED PRECIPITATED SILICA

FIELD OF THE INVENTION

The present invention relates to a process for the preparation of finely divided precipitated silica. More particularly the present invention relates to step wise neutralization of soluble alkali metal silicates with acidifying agents viz. mineral acid and acidic silica sol in order to obtain silica having more than 75% particles finer than 10 microns ($\mu m$).

BACKGROUND OF THE INVENTION

Silica is useful in reinforcing elastomers such as rubbers and in improving the resistance of rubbers to abrasion. The high structured precipitated silica having fine particle size is particularly used as antiblocking agent for polypropylene and polyethylene films having very high transparency. They are also used as a carrier for dentally active substances, which are stored at the site of action and then release the active substance in small doses over a relatively long period of time (deposition effect, controlled release). Thus, the silica acts as active substance stores which contain the active substance in absorbed, adsorbed or chemisorbed form. Silica is also used in catalysis, inks, papers and in the food industry.

US Patent (Pub.) No. 2006/0027142 A1 (Feb. 9, 2006) assigned to Huang Yung Hui describes new method of producing narrower particle size distribution precipitated silica and/or silicate materials. Such a method permits a significant reduction in manufacturing costs through the utilization of more efficient drying/evaporation components, in essence, in one potentially preferred embodiment, production of such silica and/or silicate materials followed directly by a hydraulic chamber press filtering step combined with vacuum dewatering subsequently leading to the needed resultant particle comminution. The resultant precipitated silicas and/or silicates produced thereby exhibit greater density prior to comminution and thus greater propensity for more uniform milling than previously utilized and prevalent spray/flash drying apparatuses. Also encompassed within this invention are the resultant precipitated silica and/or silicate particles produced, including those that surprisingly exhibit extremely high transmittance properties, thereby potentially providing excellent narrow particle distribution silica materials for clear (transparent) end-uses. This process involves post-synthesis treatment to get the narrow particle distribution using a hydraulic chamber press-filtering step combined with vacuum dewatering. This will add to the cost of production.

US Patent (Pub.) No. US 2005/0228106 A1, (Oct. 13, 2005) assigned to Schaefer et al. describes a method for the preparation of readily dispersible precipitated silica with primary particles of about 5 nm radius, having BET specific surface in the range of 280-350 $m^2/g$ and bulk density in the range of 0.4 to 0.6 g/cc. The precipitated silica in this invention is obtained by neutralization of sodium silicate solution in different steps under reduced ionic strength and at elevated temperature in the range of 60 to 100° C. The neutralizing agents used are sulfuric acid and silicic acid. This process involves surface modification of primary particles and aggregates by organo-silanes in order to prevent agglomeration of the aggregates to obtain hydrophobic surface with size of the particles in the colloidal range. The primary particles are measured by small angle X-ray scattering (SAXS) technique; however no mention has been made for the size of secondary (aggregates) or tertiary (agglomerates) particles. In this invention the use of silicic acid in one step of the process makes process complicated, as silicic acid is prepared by passing the silicate solution through a column of cation exchange resin and this solution is unstable and cannot be stored for the longer time. Silicic acid thus obtained should be used immediately and can be stored at lower temperature for few hours only. Another drawback is that the reaction time is longer and it takes about 150 to 200 minutes for complete neutralization.

U.S. Pat. No. 6,902,715 (Jun. 7, 2005) assigned to Maus, et al. describes an invention which provides silica particles, which include the following physical properties: BET surface area: 100-700 $m^2/g$; DBP absorption: 100-500 g/100 g; tamped density: 100-250 g/l; ALPINE sieve residue>63$\mu$: <5%; and particle sizes (cumulative volume distribution): $d_{95}$<40 $\mu m$; $d_{50}$<20 $\mu m$; and $d_5$<10 $\mu m$. The present invention also provides a process for producing silica having a narrow particle size distribution, which includes drying a silica suspension in a pulse combustion dryer to produce silica particles having particle size distribution (cumulative volume distribution): $d_5$<10 $\mu m$; $d_{50}$<20 $\mu m$; and $d_{95}$<40 $\mu m$. According to this invention fine size particles are achieved by post-synthesis treatment, which required special type of pulse combustion dryer. This may add to the cost of production.

U.S. Pat. No. 7,037,476 (May 2006) Raksh Vir Jasra et al. describes a new process for the preparation of free flowing hydrated amorphous silica from Kimberlite tailing—a waste in diamond mining. The process comprises treating of Kimberlite with acid, further reacting it with alkali solution to obtain soluble metal silicate solution, which is subsequently neutralized with mineral acid to polymerize silica as insoluble precipitates. The product is useful in rubber, paints as abrasive etc. The drawback, of the process is that the treatment of kimberlite with acid, filtering & washing to remove adhering soluble salt and the dissolution of silica in alkali at high temperature, are time consuming which increases the over all time of one batch. More numbers of unit operations, adversely affects the economics of the process.

US Patent Application No. 20030118500 (2003) assigned to Chevallier, et al. discloses a process for the preparation of precipitated silica, comprising the reaction of a silicate with an acidifying agent, whereby a suspension of precipitated silica is obtained, followed by separation and drying of this suspension, characterized in that the precipitation is carried out in the following way: (i) an initial stock solution is formed containing at least some of the total amount of the silicate used in the reaction and at least one electrolyte, the concentration of silicate (expressed as $SiO_2$) in the said initial stock solution being between 50 and 60 g/l, (ii) the acidifying agent is added to the said stock solution until a pH of between 7 and 8.5 for the reaction medium is obtained, (iii) the acidifying agent is added to the reaction medium along with, where appropriate, simultaneously, the remaining amount of the silicate, an additional amount of acidifying agent is added to the reaction medium, preferably until a pH of between 4 and 6 is obtained in the reaction medium. The separation comprises a filtration and washing operation using a filter equipped with a means of compacting, a suspension having solids content of less than 17% by weight is dried by spraying. The drawback of the process is that both the solutions are to be added simultaneously and their rates are to be controlled very critically. Slight variation in rate of addition may affect the pH of the reaction mass and subsequently the quality of silica. Spray drying is required for obtaining silica of desired particle size. This requires high energy input.

U.S. Pat. No. 6,468,493 (2002) assigned to Chevallier, et al. describes the process for the preparation of precipitated silica, which comprises of the following steps i) an initial stock solution is prepared containing some of the total amount of silicate used in the reaction and at least one electrolyte. The silicate concentration in terms of $SiO_2$ in the said initial stock solution is in the range of 40 to 330 g/l and electrolyte concentration is in the range of 12 to 20 g/l. Acidifying agent is added to the stock solution until pH value of between 7 and 8.5 is obtained. To this solution an acidifying agent and remaining silicate solution is simultaneously added in such a way that the pH of the reaction mixture does not change. Subsequently an additional amount of acidifying agent is added to the reaction mixture to bring down the pH of the reaction mixture in the range of 4.5 to 5.5. The temperature of the reaction medium is kept between 68° C. to 98° C. The drawback of the process is that initial addition of acid to bring down pH to below 8.5 is critical as it leads to probability of gel formation. Besides, in the simultaneous addition of solutions the rates are to be critically controlled to maintain the pH.

U.S. Pat. No. 6,180,076 (2001) assigned to Uhriahdt et al. describes a method for the preparation of readily dispersible precipitated silica having BET specific surface in the range of 120-200 $m^2/g$, DBP index 150-300 and some of the particles are of less than 1 μm after degradation of the particles by ultra-sonication. The particles are readily dispersible having degradability ratio wK<3.4 μm. The wK coefficient defined as a ratio of peak height (maximum) of non-degradable particles in the range of 1 to 100 μm and a maximum of the degraded particles in the range of <1 μm after ultrasonic treatment at 100 W for 4.5 minutes. The precipitated silica is obtained by the reaction of alkali metal silicate with mineral acid at a temperature from 65° to 95° C. at pH of 7.0 to 11.0 with continuous stirring. The reaction is continued up to a solids concentration of 40-110 g/l and the final pH is adjusted to a value between 3 and 5. The product is filtered, washed and then dried. Reaction as per this invention is carried out in two steps: 1) Addition of water glass and acid for 15 to 25 minutes followed by interruption of the addition for 30 to 90 minutes. 2) Addition of water glass and acid for 50 to 70 minutes. The total reaction time is 130 to 140 minutes. The particle size obtained after ultra-sonication at 100 W for 4.5 min as per some of the embodiments is <5 μm. The time of reaction is comparatively longer and the particle size without ultra-sonication has not been mentioned.

U.S. Pat. No. 6,214,912 (2001) assigned to Chevallier, et al. describes a process for the preparation of silica including the reaction of a silicate of an alkali metal 'M' with an acidifying agent, whereby a suspension of precipitated silica is obtained, and then the separation and the drying of this suspension, the said process being characterized in that the precipitation is carried out in the following manner: (i) an initial stock is formed comprising a part of the total quantity of the silicate of an alkali metal 'M' involved in the reaction, the silicate concentration, expressed as $SiO_2$, in the said stock being lower than 20 g/l, (ii) the acidifying agent is added to the said initial stock until at least 5% of the quantity of $M_2O$ present in the said initial stock is neutralized; (iii) acidifying agent is added to the reaction mixture simultaneously with the remaining quantity of alkali metal silicate such that the consolidation ratio, that is to say the ratio of quantity of silicate added (expressed as $SiO_2$) per quantity of silicate present in the initial stock (expressed as $SiO_2$) is between 12 and 100. In the stage (iii) the added quantity of acidifying agent is preferably such that 80 to 99% of the added quantity of $M_2O$ is neutralized. The reaction mixture is aged for 1 to 60 minutes. Finally, after the precipitation, an additional quantity of acidifying agent is added to the reaction mixture to reach the pH between 3 and 6.5. The drawback of this process is that during simultaneous addition of silicate and acid in stage (iii) it is difficult to adjust the quantity of acidifying agent that neutralizes 80 to 99% of the added quantity of $Na_2O$, which makes the process complicated.

U.S. Pat. No. 5,851,502 (1998) assigned to Turk et al discloses that precipitated silica can be prepared by introducing water into a precipitation vessel, adding water glass until an alkali value is between 5-15 and simultaneously adding water glass solution and sulfuric acid until the pH of the reaction mass is around 8.5, interrupting precipitation for some time and then further continuing the neutralization with acid until the pH of the slurry is ca. 4. The drawback of the process is that both the solutions are to be added simultaneously and their rates are to be controlled very critically. Spray drying is required to obtain desired product, which required high-energy input.

Indian Patent No. 176707 (1996) assigned to Mody, et al. discloses a process for the preparation of precipitated silica at ambient temperature using hydrochloric acid. The process involves preparing aqueous solution of sodium silicate having 1 to 1.3 N $Na^+$ ion concentration, adding 14-16% hydrochloric acid to the said solution at constant rate over a period of 10-60 minutes under continuous stirring to bring down the pH of the resultant mixture to around 10.8, continuing addition of the same acid for 3-6 hours to bring down the pH between 3 and 4 to obtain the precipitated silica. Finally, separating, washing, drying and pulverizing the said precipitated silica by known methods. The drawback of this process is that complete neutralization of alkali metal silicate solution at ambient temperature takes very long time, which makes process uneconomical. Besides, the process is technically feasible only with hydrochloric acid and not with other acids.

U.S. Pat. No. 5,342,598 (1994) assigned to Persello describes a process wherein the silica particulates are prepared by simultaneous addition of sodium silicate and a diluted acid into a dispersion of colloidal silica, under continuous agitation. At the completion of the reaction the pH of the suspension is between 3 and 7. In this process, colloidal silica is used as a nucleating agent and is separately prepared by heating a sodium silicate solution at around 75° C. and adding acid until the final pH is around 9.5. The drawback of the process is that both the solutions are to be added simultaneously and their rates are to be controlled very critically. Moreover, dilute colloidal silica is needed for precipitation of silica.

U.S. Pat. No. 5,094,829 (1992) assigned to Krivak et al. discloses a method for the preparation of reinforced precipitated silica having BET specific surface in the range of 220 to 340 $m^2/g$ with pore diameter of 9 to 20 nm. The process involves the neutralization of alkali metal silicate solution in multiple stages of precipitation and aging. About nine stages of reactions are involved where in certain stages the reaction mixture is brought to pH below 7 and again pH is raised to alkaline condition. Further precipitation by simultaneous addition of acid and silicate solution is commenced and again pH is brought to acidic condition. At least three aging steps are involved in the process. The reaction in first step is carried out at temperature below 50° C. and then raised to 80° to 95° C. The drawback of the process is that the reaction time is more than 160 minutes, which makes the process uneconomical. The particle size of the product is not mentioned.

U.S. Pat. No. 5,034,207 (1991) and U.S. Pat. No. 5,123,964 (1992) assigned to Kerner et al. describes a process for preparation of silica, having BET specific surface in the range of 150 to 350 $m^2/g$, bulk density between 60 and 120 g/liter and at least 70% particles having size of 1 to 6 μm, can be obtained by heating water glass solution at 700 to 80° C. under agitation, adding concentrated sulfuric acid into water glass solution until half of the alkali present has been neutralized, shearing the reaction mixture and optionally raising the temperature at the same time to 86° C. Addition of acid is interrupted for 30 to 120 minutes and acid addition is continued until the pH of suspension is 3 to 3.5. The silica suspension is optionally diluted with water and a centrifugal pump and a hydrocyclone separates the coarse particles. The silica is separated by filtration, washed and again suspended in water and spray dried. The suspension during the reaction is sheared by passing it through shearing unit (e.g. Dispax reactor) and reintroduced from the top of the reaction vessel. In this prior art the suspension is sheared through shearing unit, which requires high energy input and that also add to the capital cost.

U.S. Pat. No. 4,495,167 (1985) assigned to Nauroth et al. describes a process for the preparation of precipitated silica having specific surface area higher than 400 m$^2$/g, DBP number higher than 300 and more than 99% particles <63 μm. The products are prepared by addition of sodium silicate and sulfuric acid simultaneously in such a way that the water present in the reaction vessel has pH in the range of 6-7 at 40° to 42° C., while stirring. The reaction suspension is sheared with a turbine type shearing device during the whole course of reaction i.e. 146 minutes. After 13$^{th}$ minute, addition of acid and silicate solution is interrupted for 90 minutes and again resumed at the same rate, which was previously used to obtain final silica concentration of 46 g/liter. The suspension of the product is then aged at room temperature for 12-17 hours. The product is separated by filtration, washed and re-suspended in water and spray dried. The product obtained by jet milling showed almost 99.99% particles having particle size less than 63 μm. However, particle size distribution of the particles less than 63 μm size has not been mentioned in the invention. This process takes 12 to 19 hours long time and use of shearing requires high energy input and additional capital cost for the process.

U.S. Pat. No. 4,243,428 (1981) assigned to Donnet et al. describes a process to obtained silica by neutralization of a solution of sodium silicate with an acid under conditions which influence the properties of the silica finally obtained. The products obtained having a specific surface area ranging between 100 and 600 m$^2$/g, which do not vary upon drying, due to the action of a strong acid on an alkaline silicate, characterized by the fact that the addition of strong acid to the alkaline silicate is interrupted one to three times. According to another embodiment of this prior art the temperature of the reacting medium is varied during two phases in which strong acid is successively added to the silicate, separated by one interruption. Another embodiment of this prior art is the speed at which the acid is added. According to a preferred embodiment of this prior invention to obtain silica having particle size less than about 20 μm, the acid is added to the silicate at a rate varying according to a law such that the residual alkalinity and the concentration of the total silica decrease linearly as a function of the reaction time, in accordance with the following equation in which:

$$D = \frac{Vi(Ci/62 + Ca/98)Ci/62}{T(Ci/62 + Ca/98 - Ci \times t/62 \times T)^2}$$

D=flow at any time 't'; Vi=volume of initial silicate solution; Ci=Na$_2$O concentration of the initial silicate expressed in g/liter; Ca=concentration of the acid used, expressed in g/liter; T=total time of the reaction; t=time in minutes. However, in order to maintain the said condition the rate of addition of acid is continuously changed during the course of reaction and hence the process becomes complicated.

SUMMARY OF THE INVENTION

The present invention can provide a process for the preparation of finely divided precipitated silica having more than 75% particles finer than 10 μm, an average particle size in the range of 5 to 6 μm, and a size distribution index [I =($d_{0.9}$ −$d_{0.1}$)/2$d_{0.5}$] in the range of 0.8 to 1.2.

Embodiments of the invention can use water-soluble alkali metal silicate for the preparation of precipitated silica having fine particle size. The alkali metal silicate can be sodium silicate.

Embodiments of the present invention can also use sodium silicate of SiO$_2$:Na$_2$O mole ratio in the range of 3.0 to 3.5.

The present invention can also provide stepwise neutralization of the sodium silicate solution at elevated temperature in the range of 60 to 90° C. using acidifying agents to obtain precipitated silica having average particle size of 5 to 6 μm.

Embodiments of the present invention can use dilute solution of mineral acids such as sulfuric acid and acidic silica sol (silicic acid) for the preparation of precipitated silica having desired properties.

The invention also provides a process for preparing precipitated silica that is compatible with use as an antiblocking agent for polypropylene and polyethylene films having high transparency, as a reinforcing agent for elastomers like rubber, as a carrier material for various active materials, as an abrasive in toothpaste formulations, or as a thickening and matting agent in paints, varnishes and ink.

The present invention provides a process for the preparation of finely divided precipitated silica, the said process comprising the steps of:
  (i) preparing a dilute solution of sodium silicate having silica concentration in the range of 40 to 70 g SiO$_2$ per liter,
  (ii) adjusting the sodium ion concentration of silicate solution of step (i) by adding sodium salt in the range of 0.1 to 1.0 moles per liter;
  (iii) preparing a dilute mineral acid solution in the concentration range of 1 to 10 N;
  (iv) preparing separately a stable silica sol at an ambient temperature by adding sodium silicate solution in the range of 5 to 30 percent of step (i) to mineral acid prepared in step (iii) under continuous agitation;
  (v) heating the dilute sodium silicate solution prepared in step (i) at a temperature in the range of 50 to 90° C.;
  (vi) neutralizing 10 to 30 percent of the alkali of the total alkali present in the above said sodium silicate solution of step (v) with dilute acid solution prepared in step (iii) over a time period of 5 to 20 minutes, under stirring, at a temperature in the range of 50 to 90° C.;
  (vii) interrupting the neutralization of sodium silicate for a time in the range of 5 to 30 minutes while maintaining the elevated temperature;
  (vii) further neutralizing the sodium silicate solution obtained in step (vii) with stable silica sol prepared in step (iv) over a time period of 10 to 30 minutes, under stirring;
  (ix) interrupting again the above said neutralization process for a time period of 3 to 10 minutes;
  (x) adding the remaining mineral acid to the above said reaction mass of step (viii) over a time period of 5 to 30 minutes so that the final pH of the reaction mixture is in between 3 to 5;

(xi) aging the above said reaction mixture for a time period of 2 to 10 minutes;
(xii) circulating continuously the above said reaction mass through a centrifugal pump at rate of 15 to 20 cycle per hour during the reaction steps (vi) to (xi)
(xiii) separating the solid silica from the reaction mass by filtration, washing the filter cake with water to remove adhering sulfate impurities;
(xiv) drying the cake at a temperature in the range of 90 to 110° C. and
(xv) pulverizing the silica to obtain fine powder and jet milling the powder to obtain finely divided silica powder.

In an embodiment of the present invention the mole ratio of $SiO_2/Na_2O$ in sodium silicate used in step (ii) is in the range of 3.0 to 3.5.

In yet another embodiment the mineral acid used is $H_2SO_4$ with a concentration in the range of 1 to 10 N.

In yet another embodiment the reaction temperature used in step (vi) is in the range of 60 to 85 degree Celsius.

In yet another embodiment the silica sol is prepared while maintaining the temperature and acid concentration is in the range of 20 to 40 degree Celsius and of 1 to 10N, respectively.

In yet another embodiment the intermittent interruption of acid addition in step (vii) is maintained for a period in the range of 2 to 15 minutes.

In yet another embodiment the time of addition of remaining stoichiometric acid to the reaction mixture in step (ix) to attain the final pH in the range of 3 to 5, is in the range of 5 to 20 minutes.

In yet another embodiment the rate of cycles, for circulating the reaction mass through a centrifugal pump in steps (vi) to step (xi) is in the range of 15 to 20 cycles per hour.

In still another embodiment the finely divided precipitated silica obtained has the following characteristics:

| | |
|---|---|
| BET surface area (m$^2$/g) | 200-390 |
| Oil absorption capacity (g/100 g) | 200-280 |
| Bulk density (g/cc) | <0.10 |
| Average Particle size, $d_{0.5}$ (μm) (Measured with Mastersizer 2000 Malvern Instrument) | 5-6 |
| Particle size, (% < 10 μm) (Measured with Mastersizer 2000 Malvern Instrument) | 75-97 |
| Size distribution index [I = $(d_{0.9} - d_{0.1})/2d_{0.5}$] | 0.8-1.2 |

DESCRIPTION OF THE INVENTION

The aim of the present invention is directed to provide a process for preparing finely divided precipitated silica having extremely fine particle size. The process involves the controlled neutralization of alkali silicate solution with a combination of neutralizing agents viz. mineral acid and stable silica sol at elevated temperature and under controlled conditions viz. concentration of reactants, temperature, time and mode of neutralization. The neutralization process is intermittently interrupted for the growth of the particles. During the neutralization process the reaction mass is continuously agitated to control the coagulation of the particles. The process can be carried out in an open vessel and the product can be easily recovered by conventional filtration techniques, dried and pulverized to obtain fine powder.

The process involves the controlled neutralization of sodium silicate solution in presence of electrolyte as coagulating agent. The neutralization of silicate solution is carried out at elevated temperature in the range of 50° to 90° C. by using diluted mineral acid of concentration in the range of 1 to 10N and stable silica sol. In the present process, neutralization is carried out such that 10 to 30% of the total alkali is neutralized and the reaction mass is aged under stirring for a period in the range of 5 to 20 minutes. Subsequently, separately prepared stable silica sol is added while agitating the reaction mass and maintaining the reaction temperature. The reaction mass is again aged for at least 3 minutes and the remaining mineral acid is added for a period between 5 to 30 minutes. On attaining a pH of 3 to 5, the acid addition is stopped. During the course of neutralization the reaction mixture is continuously circulated through a centrifugal pump at the rate of 15 to 20 cycles per hour during the entire course of reaction.

The properties which characterize the precipitated silica obtained as per the present invention are determined in the following manner.

The BET surface area is determined by the adsorption of nitrogen at liquid nitrogen temperature as described by Brunauer, Emmet and Teller in *Journal of the American Chemical Society*, Volume 60, page 309 (1938) using surface area analyzer, ASAP 2010C, Micromeritics USA.

The oil absorption value is determined by following method:

The apparatus consists of a glass plate, 6 inches by 6 inches fixed in a wooden frame and sharp edged stainless steel spatula (2 inches width) with handle. Accurately weighed 5.0 g of sample is placed on the plate. A burette is filled with double boiled linseed oil. Oil is added drop by drop into the powder and mixed with powder by means of the spatula. The test is completed when the oil mixed with powder produces, a stiff, putty like paste, which does not break or separate. The volume of oil added is noted. From the density of oil, the weight of oil is calculated. From this, the percentage oil absorption is calculated as follow:

Oil Absorption capacity=(Weight of oil/Weight of sample)×100.

The values of bulk density is determined by following method

The method prescribed by the Indian Standard Specification (IS: 1420-1959) for 'Light Basic Magnesium Carbonate for Rubber Industry' was adopted to determine the bulk density. The apparatus consists of wooden stand, a measuring cylinder with rubber cork. The distance between zero and 250 ml graduation mark is 200 mm. The height of the free fall of the cylinder is 25 mm. A pre-weighed quantity (W) of the sieved and dried sample is gently slipped in to cylinder. The cylinder with the rubber cork is then assembled in to the wooden stand. The cylinder is gently raised to a height of 25 mm in such a way that it did not dash with the upper stop and then released smoothly. The timing of rising and releasing were so adjusted that one tap is given at every two seconds. Total 50 taps are given. Then the volume (V) is noted and bulk density is calculated as under:

Bulk density (g/ml)=Weight of powder (W)/Volume of Powder (V).

The particle size distribution analysis was done by laser diffraction technique using Mastersizer 2000, Malvern Instruments using dry powder.

The invention provides a process for the preparation of precipitated silica which is characterized by the following properties:

| | |
|---|---|
| BET surface area (m²/g) | 200-390 |
| Oil absorption capacity (g/100 g) | 200-280 |
| Bulk density (g/cc) | <0.10 |
| Average Particle size, $d_{0.5}$ (μm) (Measured with Mastersizer 2000 Malvern Instrument) | 5-6 |
| Particle size, (% < 1 0 μm) (Measured with Mastersizer 2000 Malvern Instrument) | 75-97 |
| Size distribution index [I = $(d_{0.9} - d_{0.1})/2d_{0.5}$] | 0.8-1.2 |

Finely divided amorphous precipitated silica in accordance with the present invention can be prepared by neutralization of silicate solution with combination of neutralizing agents viz. mineral acid and stable silica sol, under a wide range of variables as described in the text. It is understood that this type of neutralization with intermittent interruption of neutralization helps in controlled growth of the particle in situ, which overall controls the particle size distribution of the final product. The prior art does not divulge nor teach how finely divided silica having 75% particles finer than 10 microns can be prepared in-situ by controlled neutralization of alkali ($Na_2O$) in dilute metal silicate solution making use of mineral acid in the initial stage and acidic silica sol in the intermediate stage and finally adjusting the pH again with mineral acid. The hitherto known processes reveal the post synthesis treatment and/or the reaction mixture is subjected to high shear, to reduce the particle size of silica prepared. Novel steps employable in practicing the present invention include (i) the process dispenses the need of simultaneous addition of alkali metal silicate solution and mineral acid under stringent control of pH; (ii) the process does not require the need of ion exchange resin to prepare stable silica sol; (iii) the neutralization can be completed within a period of 80 minutes and it obviates the need of long interruption time during the reaction.

The following examples are given by way of illustration and therefore should not be construed to limit the scope of the present invention.

EXAMPLE-1

64 liters of sodium silicate solution containing 12.0 kg of sodium silicate having $SiO_2/Na_2O$ mole ratio equal to 3.4 is prepared in reaction vessel and 2.45 kg of sodium sulfate is dissolved in it while agitating the solution vigorously. The solution is heated to 75° C. and to this solution 3N sulfuric acid is dosed at the rate of 13.23 liters/h, after 10 min of precipitation time the acid addition is interrupted for 10 minutes. Acidic silica sol prepared separately is dosed to the reaction mixture at the rate of 64.2 liters/h for 20 minutes. Acidic silica sol is prepared by addition of 16 liters of sodium silicate solution containing 3 kg of sodium silicate to 5.4 liters of 3N sulfuric acid at room temperature while stirring. Addition of acidic silica sol is interrupted for 5 minutes followed by addition of 3N sulfuric acid for 10 minutes to bring the pH of the reaction mixture to 4. Reaction mixture is aged for 5 minutes while agitating at 75° C. Precipitated silica is separated by vacuum filtration and wet cake was washed until sulfate free filtrate is obtained. The cake is dried at 110° C. in tray drier and pulverized to obtain the product, optionally it is jet milled. The product having 276 m²/g of BET Surface area, 240 g/100 g Oil absorption, 0.08 g/cc bulk density, 5.8 μm average particle size with 75% particles <10 μm was obtained. The jet milling of the product resulted in further improvement in particle size distribution with 94% particles are less than 10 μm.

EXAMPLE-2

Precipitated silica is prepared same as described in Example-1. The only change made is in electrolyte concentration, instead of 2.45 kg of sodium sulfate, 2.1 kg of sodium sulfate is dissolved to the initial sodium silicate solution. The product after drying is jet milled. The product having 360 m²/g of BET Surface area, 240 g/100 g Oil absorption, 0.1 g/cc bulk density, 5.0 μm average particle size with 74% particles <10 μm was obtained. The jet milling of the product resulted in further improvement in particle size distribution with 84% particles are less than 10 μm.

EXAMPLE-3

75 liters of sodium silicate solution containing 14.0 kg of sodium silicate having $SiO_2/Na_2O$ mole ratio equal to 3.4 is prepared in reaction vessel and 2.88 kg of sodium sulfate is dissolved in it while agitating the solution vigorously. The solution is heated to 75° C. and to this solution 3N sulfuric acid is dosed at the rate of 15.64 liters/h, after 10 min of precipitation time the acid addition is interrupted for 10 minutes. Acidic silica sol prepared separately is dosed to the reaction mixture at the rate of 75.3 liters/h for 20 minutes. Acidic silica sol is prepared by addition of 18.7 liters of sodium silicate solution containing 3.5 kg of sodium silicate to 6.4 liters of 3N sulfuric acid at room temperature while stirring. Addition of acidic silica sol is interrupted for 5 minutes followed addition of 3N sulfuric acid for 10 minutes to bring pH of the reaction mixture to 4. Reaction mixture is aged for 5 minutes while agitating at 75° C. The reaction mixture is circulated through centrifugal pump from the bottom of reaction vessel and put back to reaction vessel from the top at the rate of 16 cycles per hour through out the course of reaction. Precipitated silica is separated by vacuum filtration and wet cake was washed until sulfate free filtrate is obtained. The cake is dried at 110° C. in tray drier and pulverized the product and optionally jet milled. The product obtained has 66% particles <10 μm, 7.0 μm average particle size and 325 m²/g of specific surface area. After jet milling average particle size of the product reduced to 4.9 μm and 82% particles were of less than 10 μm.

EXAMPLE-4

75 liters of sodium silicate solution containing 14.0 kg of sodium silicate having $SiO_2/Na_2O$ mole ratio equal to 3.4 is prepared in reaction vessel and 2.02 kg of sodium sulfate is dissolved in it while agitating the solution vigorously. The solution is heated to 75° C. and to this solution 3N sulfuric acid is dosed at the rate of 15.64 liters/h, after 10 min of precipitation time the acid addition is interrupted for 10 minutes. Acidic silica sol prepared separately is dosed to the reaction mixture at the rate of 75.3 liters/h for 20 minutes. Acidic silica sol is prepared by addition of 18.7 liters of sodium silicate solution containing 3.5 kg of sodium silicate to 6.4 liters of 3N sulfuric acid at room temperature while stirring. Addition of acidic silica sol is interrupted for 5 minutes followed addition of 3N sulfuric acid for 10 minutes to bring pH of the reaction mixture to 4. Reaction mixture is aged for 5 minutes while agitating at 75° C. The reaction mixture is circulated through centrifugal pump from the bottom of reaction vessel and put back to reaction vessel from the top at the rate of 16 cycles per hour through out the course of reaction. Precipitated silica is separated by vacuum filtration and wet cake was washed until sulfate free filtrate is obtained. The cake is dried at 110° C. in tray drier, pulverized and optionally jet milled. The product thus obtained has 373 m²/g of surface area, 0.09 g/cc bulk density, 5.0 μm average particle size and 79% particles are less than 10 μm before jet milling. After jet milling 93% particles of less than 10 μm were obtained with average particle size of 4.0 μm.

EXAMPLE-5

75 liters of sodium silicate solution containing 14.0 kg of sodium silicate having $SiO_2/Na_2O$ mole ratio equal to 3.4 is prepared in reaction vessel and 1.92 kg of sodium sulfate is dissolved in it while agitating the solution vigorously. The solution is heated to 75° C. and to this solution 3N sulfuric acid is dosed at the rate of 15.64 liters/h, after 10 min of precipitation time the acid addition is interrupted for 10 minutes. Acidic silica sol prepared separately is dosed to the reaction mixture at the rate of 75.3 liters/h for 20 minutes. Acidic silica sol is prepared by addition of 18.7 liters of sodium silicate solution containing 3.5 kg of sodium silicate to 6.4 liters of 3N sulfuric acid at room temperature while stirring. Addition of acidic silica sol is interrupted for 5 minutes followed addition of 3N sulfuric acid for 10 minutes to bring pH of the reaction mixture to 4. Reaction mixture is aged for 5 minutes while agitating at 75° C. The reaction mixture is circulated through centrifugal pump from the bottom of reaction vessel and put back to reaction vessel from the top at the rate of 16 cycles per hour through out the course of reaction. Precipitated silica is separated by vacuum filtration and wet cake was washed until sulfate free filtrate is obtained. The cake is dried at 110° C. in tray drier, pulverized and optionally jet milled. The product having 0.09 g/cc bulk density, 265 g/100 g of oil absorption capacity, 360 m²/g of surface area, 81% particles <10 μm and 5 μm average particle size was obtained before jet milling. The particles of less than 10 μm were increased to 97% after jet milling of the product with 3.7 μm average particle size.

EXAMPLE-6

2.5 liters of sodium silicate solution containing 640 g of sodium silicate having $SiO_2/Na_2O$ mole ratio equal to 3.4 is prepared in reaction vessel and 65.9 g of sodium sulfate is dissolved in it while agitating the solution vigorously. The solution is heated to 75° C. and to this solution 3N sulfuric acid is dosed at the rate of 720 ml/h, after 10 min of precipitation time the acid addition is interrupted for 10 minutes. Acidic silica sol prepared separately is dosed to the reaction mixture at the rate of 2.82 l/h for 20 minutes. Acidic silica sol is prepared by addition of 650 ml of sodium silicate solution containing 160 g of sodium silicate to 292 ml of 3N sulfuric acid at room temperature while stirring. Addition of acidic silica sol is interrupted for 5 minutes followed by addition of 3N sulfuric acid for 10 minutes to bring the pH of the reaction mixture to 4. Reaction mixture is aged for 5 minutes while agitating at 75° C. Precipitated silica is separated by vacuum filtration and wet cake was washed until sulfate free filtrate is obtained. The cake is dried at 110° C. in tray drier and pulverized and optionally jet milled. The product before jet milling has 73% of particles <10 μm and 5.8 μm average particle size, those have been change to 87% and 4.6 respectively on jet milling.

EXAMPLE-7

2.5 liters of sodium silicate solution containing 640 g of sodium silicate having $SiO_2/Na_2O$ mole ratio equal to 3.4 is prepared in reaction vessel and 65.9 g of sodium sulfate is dissolved in it while agitating the solution vigorously. The solution is heated to 75° C. and to this solution 3N sulfuric acid is dosed at the rate of 822 ml/h, after 10 min of precipitation time the acid addition is interrupted for 10 minutes. Acidic silica sol prepared separately is dosed to the reaction mixture at the rate of 2.82 l/h for 20 minutes. Acidic silica sol is prepared by addition of 650 ml of sodium silicate solution containing 160 g of sodium silicate to 292 ml of 3N sulfuric acid at room temperature while stirring. Addition of acidic silica sol is interrupted for 5 minutes followed by addition of 3N sulfuric acid for 10 minutes to bring the pH of the reaction mixture to 4. Reaction mixture is aged for 5 minutes while agitating at 75° C. Precipitated silica is separated by vacuum filtration and wet cake was washed until sulfate free filtrate is obtained. The cake is dried at 110° C. in tray drier and pulverized. The product obtained has 80% particles <10 μm, 5.5 μm average particle size, 0.09 g/cc bulk density and 220 g/100 g oil absorption capacity.

EXAMPLE-8

7.56 liters of sodium silicate solution containing 1.88 Kg of sodium silicate having $SiO_2/Na_2O$ mole ratio equal to 3.4 is prepared in reaction vessel and 193.9 g of sodium sulfate is dissolved in it while agitating the solution vigorously. The solution is heated to 75° C. and to this solution 3N sulfuric acid is dosed at the rate of 2.45 liters/h, after 10 min of precipitation time the acid addition is interrupted for 10 minutes. Acidic silica sol prepared separately is dosed to the reaction mixture at the rate of 8.24 liters/h for 20 minutes. Acidic silica sol is prepared by addition of 1.89 liters of sodium silicate solution containing 470 g of sodium silicate to 856 ml of 3N sulfuric acid at room temperature while stirring. Addition of acidic silica sol is interrupted when? for 5 minutes followed by addition of 3N sulfuric acid for 10 minutes to bring pH of the reaction mixture to 4. Reaction mixture is aged for 5 minutes while agitating at 75° C. The reaction mixture is circulated through centrifugal pump from the bottom of reaction vessel and put back to reaction vessel from the top at the rate of 13 cycles per hour through out the course of reaction. Precipitated silica is separated by vacuum filtration and wet cake was washed until sulfate free filtrate is obtained. The cake is dried at 110° C. in tray drier, pulverized, and optionally jet milled. The product has 0.07 g/cc bulk density, 280 g/100 g oil absorption capacity and 390 m²/g surface area. The particles of less than 10 μm has increased to 97% from 83% after jet milling of the product with 3.7 μm average particle size which is 5.1 μm before jet milling of the product.

Advantages Of The Present Invention

1. The process involves step wise neutralization of sodium silicate solution with mineral acids or acidic silica sol and simultaneous addition of acid and sodium silicate solution is not required.
2. Simple neutralization procedure is adopted wherein the rate of addition of diluted acid and acidic silica sol is only to be controlled.
3. Acidic Silica sol preparation step involves only addition of sodium silicate solution to the acid solution at room temperature and does not involve the use of cation exchange resin.
4. Neutralization of alkali present in alkali metal silicate solution with mineral acid can be completed in short duration.
5. No post-synthesis treatment is given to get finely divided particles and narrow size distribution of the precipitated silica.

The present invention can include generating sufficient quantity of nuclei by partial neutralization of sodium silicate solution with dilute mineral acid in presence of electrolyte. The interruption time of acid addition is so optimized that the nuclei already formed in the first step grow to the desired size avoiding formation of silica gel structure. The sodium ion concentration and pH of the sodium silicate solution is so controlled, by the appropriate rate of acid/silica sol (silicic acid) addition during further neutralization that the silica particles coagulate to form aggregates which undergo reinforcement to desired degree without further nucleation and growth of the particles. Thus, the present invention produces finely divided precipitated silica in situ with narrow size distribution and the desired properties.

The invention claimed is:

1. A process for the preparation of finely divided precipitated silica having 66 percent or more of particles of size less than 10 μm, the process comprising the steps of:
   (i) preparing a dilute solution of sodium silicate in at least two parts having a silica concentration in the range of from 40 g to 70 g $SiO_2$ per liter;
   (ii) adjusting the sodium ion concentration to be in the range of from 0.45 to 1 mole per liter of a first part of the silicate solution of step (i) by adding a sodium salt;
   (iii) providing a dilute mineral acid solution having a concentration in the range of from 1 N to 10 N;
   (iv) preparing, separately from the sodium silicate solution prepared in step (ii), a stable silica sol at an ambient temperature by adding a second part of the sodium silicate solution of step (i) to a part of the mineral acid solution provided in step (iii) under continuous agitation;
   (v) heating the sodium-ion-adjusted dilute sodium silicate solution prepared in step (ii) at an elevated temperature in the range of from 50° C. to 90° C.;
   (vi) neutralizing from 10 percent to 30 percent of the total alkali present in the sodium silicate solution of step (v) with a part of the dilute mineral acid solution provided in step (iii) over a time period of 5 to 20 minutes, under stirring, at an elevated temperature in the range of from 50° C. to 90° C.;
   (vii) interrupting the neutralization of the sodium silicate solution in step (vi) for a time in the range of from 5 minutes to 30 minutes while maintaining the elevated temperature;
   (viii) neutralizing the sodium silicate solution obtained in step (vii) with stable silica sol prepared in step (iv) over a time period of from 10 minutes to 30 minutes, under stirring;
   (ix) interrupting again the neutralization of the sodium silicate solution for a time period of from 3 minutes to 10 minutes;
   (x) adding a part of the dilute mineral acid solution provided in step (iii) to the above said reaction mixture of step (ix) over a time period of 5 to 30 minutes to adjust the pH of the reaction mixture to a value of from 3 to 5;
   (xi) aging the reaction mixture of step (x) for a time period of from 2 minutes to 10 minutes;
   (xii) circulating continuously the reaction mixture through a centrifugal pump at a rate of from 15 cycles to 20 cycles per hour during steps (vi) to (xi);
   (xiii) separating solid silica from the reaction mixture by filtration, and by washing the resultant filter cake with water to remove adhering impurities;
   (xiv) drying the filter cake at a temperature in the range of from 90°C. to 110°C.; and
   (xv) pulverizing the solid silica to obtain finely divided silica powder.

2. A process as claimed in claim 1, wherein the mole ratio of $SiO_2$/ $Na_2O$ in sodium silicate used in step (ii) is in the range of from 3.0 to 3.5.

3. A process as claimed in claim 1, wherein the mineral acid used is sulfuric acid with a concentration in the range of from 1 N to 10 N.

4. A process as claimed in claim 1, wherein the reaction temperature used in step (vi) is in the range of from 60° C. to 85° C.

5. A process as claimed in claim 1, wherein the acidic silica sol is prepared while maintaining the temperature and acid concentration in the range of from 20° C. to 40° C. and in the range of from 1 N to 10N, respectively.

6. A process as claimed in claim 1, wherein the intermittent interruption of acid addition in step (vii) is maintained for a period in the range of from 2 minutes to 15 minutes.

7. A process as claimed in claim 1, wherein the time of addition of the mineral acid to the reaction mixture in step (x) is in the range of from 5 minutes to 20 minutes.

8. A process as claimed in claim 1, wherein the finely divided silica powder obtained has the following characteristics:

| | |
|---|---|
| BET surface area ($m^2$/g) | 200-390 |
| Oil absorption capacity (g/100 g) | 200-280 |
| Bulk density (g/cc) | <0.10 |
| Average Particle size, $d_{0.5}$ (μm) | 5-6 |
| (Measured with Mastersizer 2000 Malvern Instrument) | |
| Particle size, (% < 10 μm) | 75-97 |
| (Measured with Mastersizer 2000 Malvern Instrument) | |
| Size distribution index [$I = (d_{0.9} - d_{0.1})/2d_{0.5}$] | 0.8-1.2. |

9. A process for the preparation of finely divided precipitated silica, the process comprising the steps of:
   neutralizing from 10 percent to 30 percent of the total alkali-present in a dilute solution of sodium silicate, the sodium silicate solution having a silica concentration in the range of from 40 g to 70 g SiO2 per liter and a sodium ion concentration adjusted by the addition of a sodium salt to be in the range of from 0.1 to 1 mole per liter, neutralization being effected with a dilute mineral acid solution having a concentration in the range of from 1 N to 10 N over a time period of 5 to 20 minutes, with stirring, at an elevated temperature in the range of from 50° C. to 90°C., to provide a reaction mixture;
   interrupting the neutralization of sodium silicate for a time in the range of from 5 minutes to 30 minutes while maintaining the elevated temperature;
   further neutralizing the reaction mixture, over a time period of from 10 minutes to 30 minutes, with stirring, with a stable silica sol prepared at an ambient temperature by adding the dilute sodium silicate solution to a dilute mineral acid with continuous agitation, the dilute mineral acid having a concentration in the range of from 1 N to 10 N;
   interrupting the neutralization of the reaction mixture for a time period of from 3 minutes to 10 minutes;
   continuing to add dilute mineral acid having a concentration in the range of from 1 N to 10 N to the reaction mixture over a time period of 5 to 30 minutes to adjust the pH of the reaction mixture to a value of from 3 to 5;
   aging the pH-adjusted reaction mixture for a time period of from 2 minutes to 10 minutes;

continuously circulating the reaction mixture during each of the foregoing steps;

recovering solid silica from the reaction mixture; and preparing finely divided solid silica from the recovered solid silica.

10. A process according to claim 9 wherein the circulating of the reaction mixture is effected through a centrifugal pump at a rate of from 15 cycles to 20 cycles per hour, and wherein recovering the solid silica from the reaction mixture comprises separating a solid silica filter cake from the reaction mixture by filtration and washing the filter cake with water.

11. A process according to claim 10 wherein preparing the finely divided solid silica comprises:

drying the filter cake at a temperature in the range of from 90° C. to 110° C.;

pulverizing the solid silica to obtain fine silica powder; and jet milling the fine silica powder to obtain finely divided silica powder.

12. A process according to claim 1 comprising jet milling the finely divided silica powder to improve the particle size distribution.

* * * * *